United States Patent [19]
Park

[11] Patent Number: 5,339,111
[45] Date of Patent: Aug. 16, 1994

[54] FORMAT ADAPTIVE SYNC SIGNAL GENERATOR

[75] Inventor: Hyun J. Park, Kyunggi-Do, Rep. of Korea

[73] Assignee: Samsung Electronics Co., Ltd., Kyunggi-do, Rep. of Korea

[21] Appl. No.: 24,138

[22] Filed: Mar. 1, 1993

[30] Foreign Application Priority Data

Feb. 29, 1992 [KR] Rep. of Korea ............ 92-3344

[51] Int. Cl.$^5$ .............................................. H04N 5/06
[52] U.S. Cl. ........................................ 348/524; 348/555
[58] Field of Search .............. 348/524, 526, 555, 558, 348/523; H04N 5/06, 5/46

[56] References Cited

U.S. PATENT DOCUMENTS

| | | | |
|---|---|---|---|
| 4,169,659 | 10/1979 | Marlowe | 348/524 |
| 4,316,219 | 2/1982 | Smith et al. | 348/523 |
| 5,148,276 | 9/1992 | Furumiya et al. | 348/524 X |

*Primary Examiner*—Mark R. Powell
*Attorney, Agent, or Firm*—Sughrue, Mion, Zinn, Macpeak & Seas

[57] ABSTRACT

A sync signal generating apparatus for use in a converter for converting a broadcast signal between different broadcast systems so as to generate a sync signal adapted for the converted broadcast system. The sync signal generating apparatus includes a first counter for generating various sync pulses using a subcarrier of a selected broadcast system among various broadcast systems as a clock, a second counter for generating an even/odd field detection pulse and various window signals, using an output signal supplied from the first counter as a clock, a first multiplexer for selectively outputting a vertical sync pulse and an equalizing pulse by a window signal, a horizontal sync signal generator for generating a horizontal sync signal having a field identical to that of an externally supplied sync signal, and a second multiplexer for selectively outputting an equalizing and vertical sync signal and a horizontal sync signal by the window signal, thereby generating a composite sync signal, which matches the specification of the selected broadcast system.

5 Claims, 4 Drawing Sheets

FORMAT ADAPTIVE SYNC SIGNAL GENERATOR

BACKGROUND OF THE INVENTION

The present invention relates in general to an apparatus for generating broadcast signals. More particularly, the present invention relates to an apparatus for converting broadcast signals compatible with a first broadcast system into broadcast signals compatible with a second broadcast system.

Generally, to receive or send broadcaste signals between areas which adopt different TV broadcast systems, the broadcast signals must be converted into formats that are compatible with the respective TV broadcast system. Presently, the various TV broadcast systems, such as NTSC, PAL, and SECAM broadcast systems, are different from each other. Therefore, to transmit a TV broadcast signal from an area which employs a PAL TV broadcast to an area which employs an NTSC TV broadcast, as an example, the TV broadcast signal of the PAL system must be converted into a format compatible with the TV broadcast signal of the NTSC system.

The respective broadcast systems have different specifications for sync signals as well as video signals. Thus, when the broadcast signal is converted, the sync signal must also be converted so that it is consistent with the broadcast system of the converted TV broadcast signal. The sync signal of the TV broadcast signal is a composite sync signal which is produced by combining a horizontal sync signal, a vertical sync signal, an equalizing pulse, etc. The components constituting such a composite sync signal have different specifications for the different broadcast systems. Therefore, to convert the sync signal, the aforesaid components of the sync signals must all be converted and then combined to form a composite sync signal that is consistent with the receiving broadcast system.

However, in conventional sync signal generating apparatus, the number of the convertible broadcast systems is limited to a single type of broadcast system. Accordingly, only limited conversion is possible. Moreover, because the odd and even fields of the sync signal are not distinguished from one another, the converted sync signal will include errors.

SUMMARY OF THE INVENTION

Therefore, to overcome the above and other problems, it is an object of the present invention to provide a sync signal generating apparatus for use in converting sync signals which are compatible of a first broadcast system into sync signals which are compatible with a second broadcast system.

It is a further object of the present invention to provide a sync signal generating apparatus in which an odd field or an even field of a horizontal sync signal is identified to generate a sync signal adapted to a corresponding field to thereby obtain a more accurate synchronization.

To accomplish the above and other objects, the present invention provides a sync signal generating apparatus for converting broadcast signals including sync signals that correspond to a first one of a plurality of broadcast systems to broadcast signals that correspond to a second selected one of the plurality of broadcast systems, the sync signal generating apparatus including a broadcast system selection switch having a first set of inputs each being coupled to a signal having a subcarrier frequency corresponding to the plurality of broadcast systems, respectively, and an output for selectively outputting one of the signals, a sync signal generator, responsive to the output of the broadcast system selection switch, for generating even and odd horizontal sync signals, a vertical sync signal, and an equalizing signal which correspond to the respective broadcast systems, a window signal generator, responsive to the equalizing signal, for generating an even/odd field detection signal, a window signal, and a vertical sync window signal, a first multiplexer having first and second inputs coupled to the vertical sync signal and equalizing signal, respectively, and an output for selectively outputting in response to the vertical sync window signal one of the vertical sync signal and equalizing signal, a horizontal sync signal generator having inputs coupled to the even and odd field horizontal sync signal, even/odd field detection signal, window signal, and an external horizontal sync signal for generating a horizontal sync signal having one of an even and odd field in accordance with the field of the external horizontal sync signal, and a second multiplexer having first and second inputs coupled to an output of the first multiplexer and horizontal sync signal generator, respectively, and an output for selectively outputting in response to an output of the window signal generator a composite sync signal.

Further, in accordance with the above objects, the present invention provides a sync signal generating apparatus for converting broadcast signals including sync signals that correspond to a first one of a plurality of broadcast systems to broadcast signals that correspond to a second selected one of the plurality of broadcast systems, the sync signal generating apparatus including a broadcast system selection switch having a first set of inputs each being coupled to a signal having a subcarrier frequency corresponding to the plurality of broadcast systems, respectively, and an output for selectively outputting one of the signals, a sync signal generator, responsive to the output of the broadcast system selection switch, for generating even and odd horizontal sync signals, a vertical sync signal, and an equalizing signal which correspond to the respective broadcast systems, means, coupled to the even and odd horizontal sync signals, for selectively generating a first signal corresponding to one of the even and odd horizontal sync signals, means, coupled to the vertical sync signal and equalizing signal, for selectively generating a second signal corresponding to one of the vertical sync signal and the equalizing signal, and means, coupled to the first and second signals, for selectively generating a composite sync signal corresponding to a combination of the first and second signals.

DETAILED DESCRIPTION OF THE PREFERRED EMBODIMENT

A preferred embodiment of the present invention will now be described in detail with reference to the accompanying drawings.

Today, there are several types of broadcast systems used in television (TV) broadcasting. As an example, these types of systems include an NTSC system, PAL system, PAL-N system, PAL-M system, SECAM system, and so on. Each of the above broadcast systems defines a different specification from which the respective sync signals are generated. The characteristics of the different specifications for the sync signals are summarized in the following Table 1.

| BROADCAST SYSTEM CHARACTERISTICS | NTSC & PAL-M | PAL-N | PAL | SECAM | REMARK |
|---|---|---|---|---|---|
| 1H DURATION | 63.5 μs | 64 μs | 64. μs | 64 μs | b |
| $H_{SYNC}$ WIDTH | 4.19–5.7 μs | 4.22–5.76 μs | 4.5–4.9 μs | 4.7 ± 0.3 μs | a |
| V-BLANK WIDTH | 19–21H | 19–25H | 18–25H | 25H | |
| PRE-EQ. PULSE DURATION | 3H | 2.5H | 2.5H | 2.5H | e |
| $V_{SYNC}$ PULSE DURATION | 3H | 2.5H | 2.5H | 2.5H | f |
| POST-EQ. PULSE DURATION | 3H | 2.5H | 2.5H | 2.5H | g |
| EQ. PULSE WIDTH | 2.29–2.54 μS | 2.3–2.56 μS | 2.2–2.4 μS | 2.35 ± 0.1 μS | c |
| SERR WIDTH | 3.8–5.6 μS | 3.84–5.63 μS | 4.5–4.9 μS | 4.7 ± 0.3 μS | d |

Figure 1:
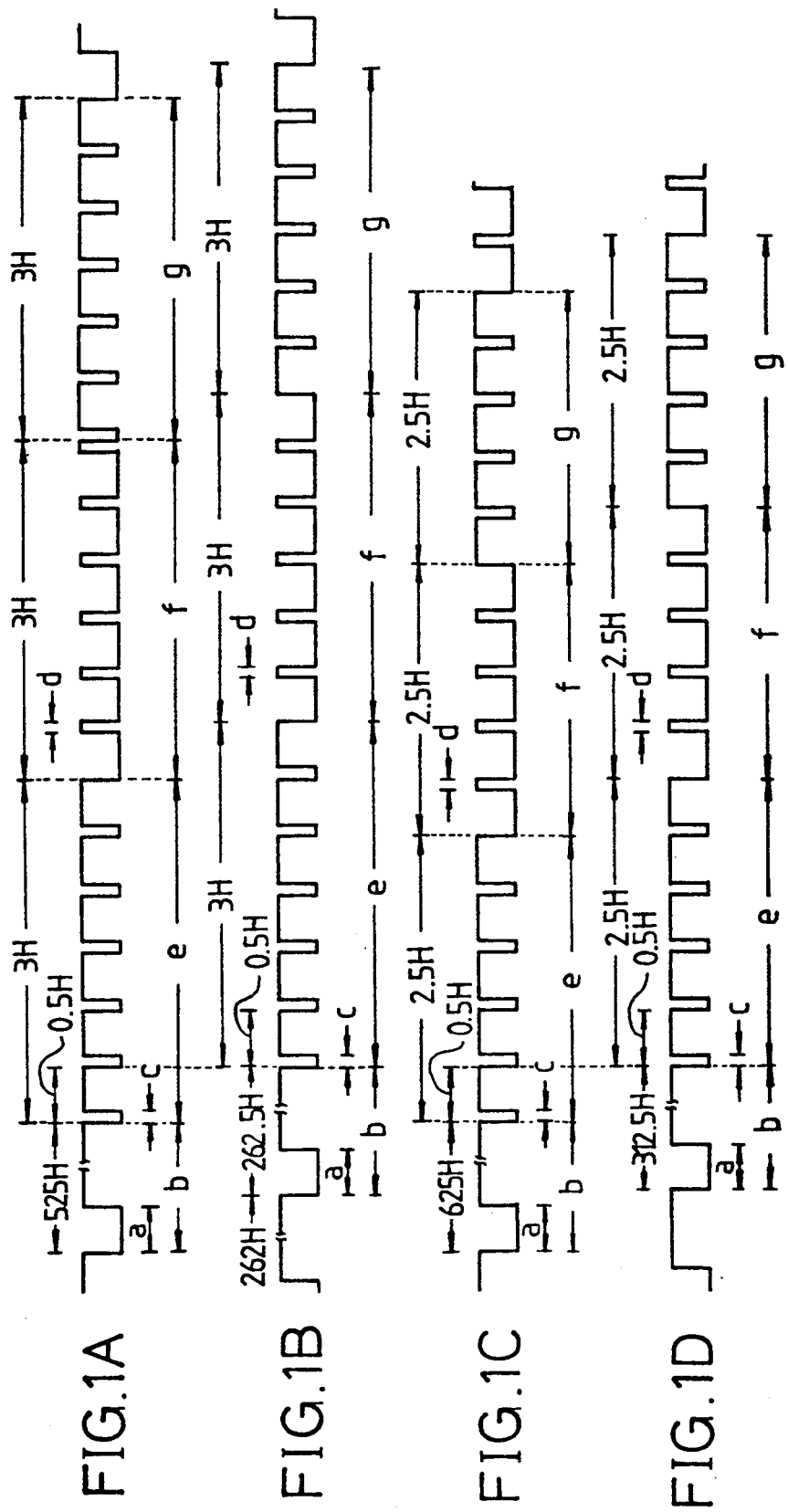
FIGS. 1A through 1D are waveform diagrams which show specifications of sync signals of the respective broadcast systems.

The waveforms of the respective sync signals according to the specifications of Table 1 are shown in FIGS. 1A through 1D. Specifically, FIGS. 1A and 1B represent an odd field and an even field of a sync signal which are used in the NTSC and PAL-M systems, respectively. In these two systems, one frame is composed of 525 scanning lines and the odd field has a time difference of 0.5 H from the even field; a unit of "H" being one period of the horizontal sync signal. FIGS. 1C and 1D represent an odd field and an even field of a sync signal which are employed in the PAL, PAL-N, and SECAM systems. In these systems, one frame is composed of 625 scanning lines and the odd field has a time difference of 0.5 H from the even field. In addition, a subcarrier signal having a frequency $f_{SC}$ and a horizontal sync signal having a frequency $f_H$ are used in each of the broadcast systems and have the following relationships:

$$NTSC\ system: f_{SC} = \frac{455}{2} f_H \approx 3.5795\ MHz$$

$$PAL\text{-}M\ system: f_{SC} = \frac{909}{4} f_H \approx 3.5756\ MHz$$

$$PAL\text{-}N\ system: f_{SC} = \left\{ \frac{917}{4} + \frac{1}{625} \right\} f_H \approx 3.5821\ MHz$$

$$PAL\ system: f_{SC} = \left\{ \frac{1135}{4} + \frac{1}{625} \right\} f_H \approx 4.4336\ MHz$$

Figure 2:
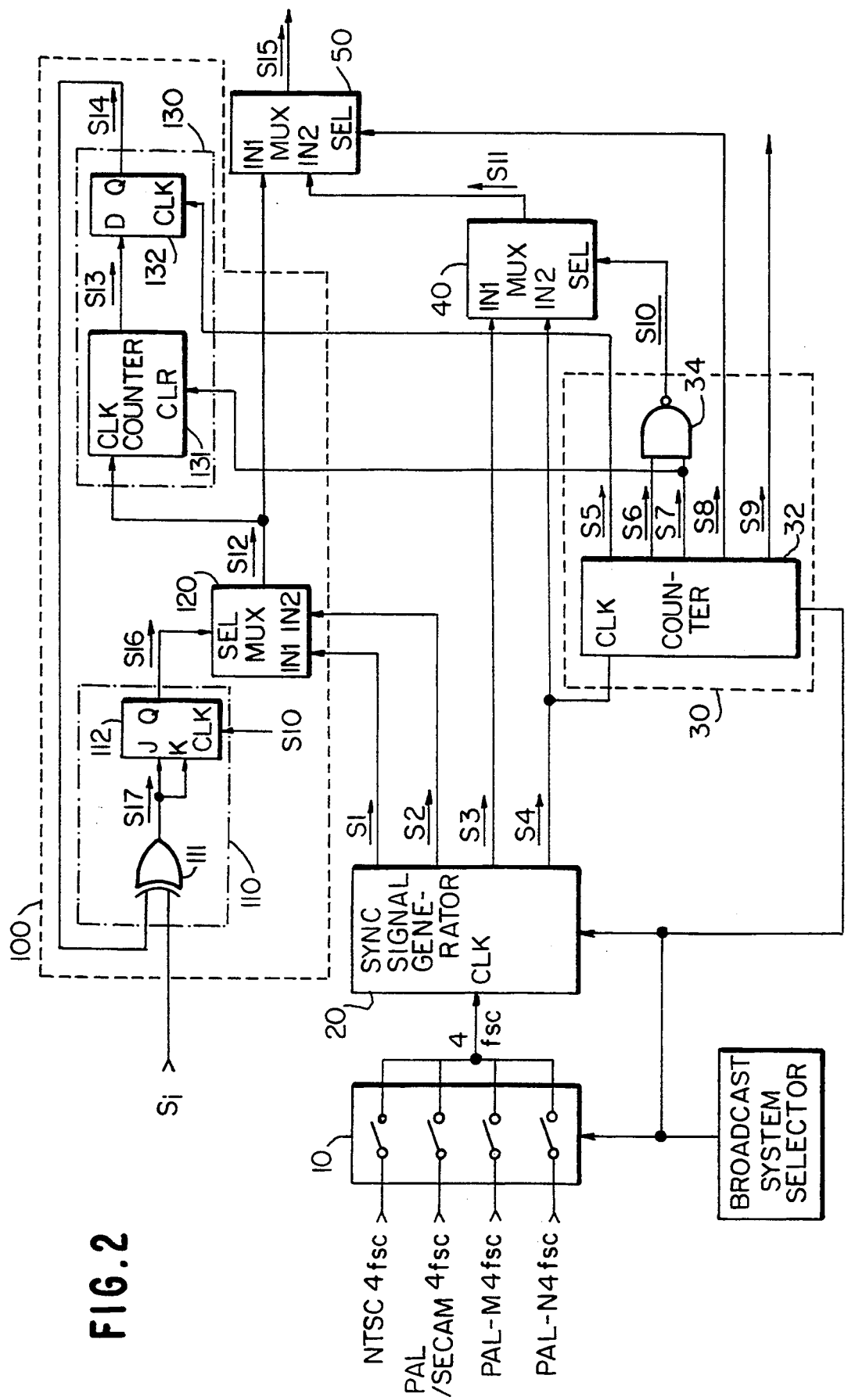
FIG. 2 is a block diagram of one embodiment of a sync signal generating apparatus according to the present invention.

FIG. 2 is a block diagram of the sync signal generating apparatus according to the present invention. FIGS. 3A through 3D are timing diagrams of various signals in the apparatus of FIG. 2.

Referring to FIG. 2, a signal having the same frequency as the subcarrier signal for each of the respective broadcast systems is input to a broadcast system selection switch 10, respectively. In response to a control signal, which is provided by a broadcast system selector 60, the selection switch 10 outputs the signal having the subcarrier frequency equal to the desired broadcast system type. That is, when the received TV broadcast signal of a first broadcast system is converted to a second broadcast system, the signal having the subcarrier frequency identical to the subcarrier frequency of the second broadcast system is selected from among all of the subcarrier signals input to the broadcast system selection switch 10 by the control signal.

The control signal is also simultaneously supplied to a sync signal generator 20 and window signal generator 30. Accordingly, the control signal places the sync signal generating apparatus in a certain mode of operation as will be described in detail below.

Figure 3A:
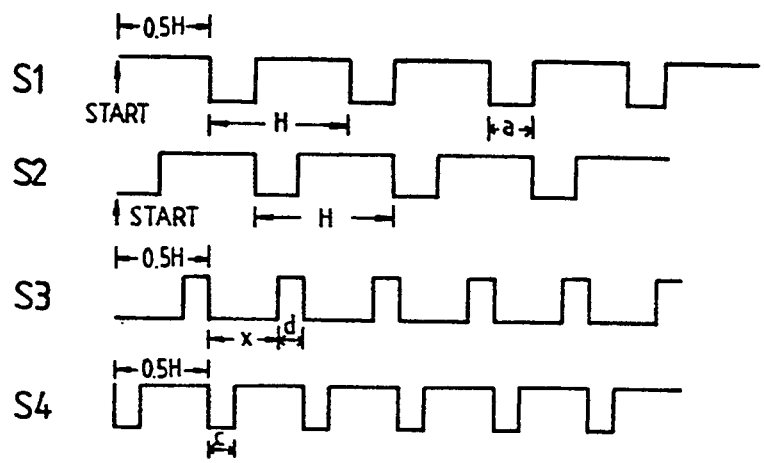
FIGS. 3A through 3D are waveform diagrams of the input/output signals of the respective components shown in FIGS. 2.

A subcarrier signal ($4f_{SC}$), which is selectively output by the broadcast system selection switch 10, is used as a clock signal by the sync signal generator 20, which includes a counter. In response, the sync signal generator 20 generates an even field horizontal sync signal S1, an odd field horizontal sync signal S2, a vertical sync signal S3, and an equalizing pulse S4, all of which are generated according to the specification of the selected broadcast system. FIG. 3A shows waveforms of these outputs.

A pulse period of the even field horizontal sync signal S1 exhibits the relationship between the subcarrier $f_{SC}$ and the horizontal signal frequency $f_H$ as set forth above. For example, in the NTSC system, the sync signal generator 20 counts the signal $4f_{SC}$ which is supplied from the broadcast system selection switch 10. That is, the sync signal generator 20 counts the horizontal sync signal frequency $f_H$ by 910 times resulting in the generation of a pulse width of one period (1 H) of the horizontal sync signal. In the PAL system, the sync signal generator 20 counts the horizontal sync signal frequency $f_H$ by 1,135 times resulting in the generation of a pulse width of one period (1 H) of the horizontal sync signal. As represented in Table 1, to obtain an horizontal sync pulse width (remark a) the sync signal generator 20 counts the signal $4f_{SC}$ to have a value in the range of 4.19 to 5.7 μsec. At the same time, the even field horizontal sync signal S1 should be maintained in a delayed state of 0.5 H.

The odd field horizontal sync signal S2 has the same pulse period and horizontal sync width as those of the aforesaid even field horizontal sync signal S1. However, the odd field horizontal sync signal is not delayed.

The vertical sync signal S3 has a pulse period of 0.5 H. A SERR width (remark d) should have a value, as represented in Table 1, according to the respective broadcast system. A pulse width (x) corresponds to a value resulting from the operation of subtracting SERR width (d) from the pulse period of 0.5 H. For example, in the NTSC system, assuming that the SERR width (d) is 4.7 μsec, which is an intermediate value between the range of 3.8 to 5.6 μsec, the pulse width (x) is as follows:

0.5 H−4.7 μsec=(63.5/2−4.7−27.05) μsec. Thus, the sync signal generator 20 counts the number of clock signals $4f_{SC}$ until reaching 27.05 μsec. Thereafter, the vertical sync signal S3 is generated by forming a pulse having a width (d).

The equalizing pulse S4 has a pulse period of 0.5 H which should have an equalizing width (c) for the respective broadcast system, as represented in Table 1. The equalizing pulse S4 is formed in a manner similar to that of the aforesaid vertical sync signal S3. For example, in the NTSC system, the number of clock signals $4f_{SC}$ is counted for 2.41 μsec, which is an intermediate value for the range of 2.29 to 2.54 μsec, thereby forming a pulse corresponding to the equalizing pulse width (c). Then, the number of clock signals $4f_{SC}$ is counted for a time resulting from subtracting 2.41 μsec from the pulse period of 0.5 H, thereby forming the remaining portion of the equalizing pulse S4. Since a period of the thus-constituted equalizing pulse S4 is 0.5 H, the frequency thereof becomes double the horizontal sync signal.

The respective sync signals S1–S4 generated by the sync signal generator 20, as described above, are supplied to a window signal generator 30, a horizontal sync signal generator 100, and a first multiplexer 40.

Figure 3B:
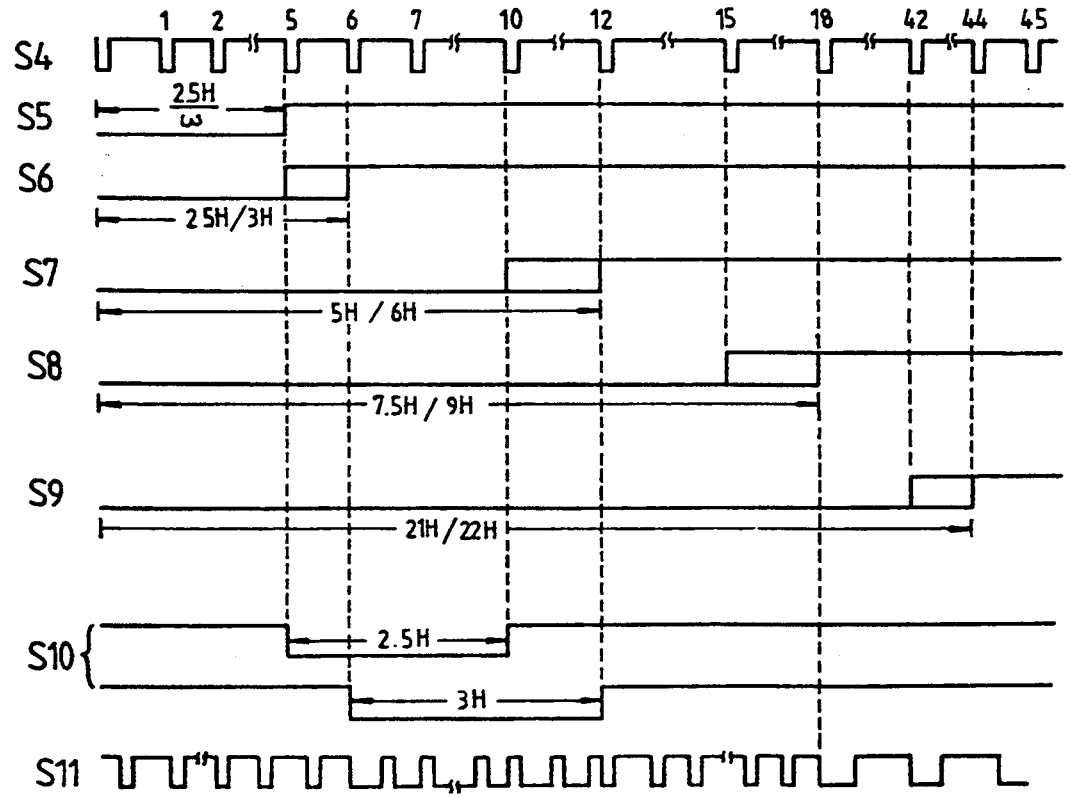

The equalizing pulse S4, having a frequency of $2 \cdot f_H$, is supplied to a counter 32 of the window signal generator 30 and is used therein as a clock signal. The counter 32 counts the number of equalizing pulses S4, and generates, as shown in FIG. 3B, an even/odd field detection pulse S5, an equalizing pulse, a window signal S6 for combining a vertical sync pulse, and a video-blanking (V-blanking) signal S9 corresponding to an interval having no video signal.

The even/odd field detection pulse S5 has a window pulse width (w) of 2.5 H which is the same for all broadcast systems. Here, the counter 32 counts the clock signal $2 \cdot f_H$ for five periods, and generates a pulse that is maintained in a high state. An overall period of the even/odd field detection pulse S5 is 262.5 H in the NTSC or PAL-M system, and 312.5 H in the PAL, SECAM, or PAL-N system.

The counter 32 also generates the 2.5 H/3 H window signal S6 that corresponds to the durations of the pre-equalizing pulse and post-equalizing pulse, and the 5 H/6 H window signal S7, which in combination with the signal S6, forms a vertical sync window signal S10. The window pulse widths (w) of the 2.5 H/3 H window signal S6 and the 5 H/6 H window signal S7 are 2.5 H and 5 H in the PAL, PAL-N, and SECAM systems, and 3 H and 6 H in the NTSC and PAL-M systems, respectively. The 2.5 H/3 H and 5 H/6 H window signals S6 and S7 are input to a NAND gate 34 to thereby constitute the vertical sync window signal S10, which has a window pulse width (w) of 2.5 H or 3 H. The window signal generator 30 generates the 7.5 H/9 H window signal S8 and supplies it to a third multiplexer 50. Accordingly, the equalizing and vertical sync signal S11, which is constituted by the 2.5 H/3 H vertical sync pulse and the 2.5 H/3 H post-equalizing pulse, is selected so as to form a portion of the composite sync signal S15. The counter 32 of the window signal generator 30 also counts the clock signal $2 \cdot f_H$ to generate the V-blanking signal S9 representing the interval having no video signal. The pulse width (w) of the V-blanking signal S9 is 21 H in the NTSC or PAL-M system, and 22 H in the PAL, PAL-N, or SECAM system.

The vertical sync signal S3 and equalizing pulse S4, which are generated by the sync signal generator 20, are coupled to first and second inputs of the first multiplexer 40, respectively. The vertical sync window signal S10 output from the NAND gate 34 is supplied to a selection terminal of the first multiplexer 40. The vertical sync pulse S3 is selected and output for an interval of 2.5 H or 3 H pulse widths (w) of the vertical sync window signal S10, while the equalizing pulse S4 is selected and output for 2.5 H or 3 H pulse widths (w) prior to or after the vertical sync window signal S10. The combination of these two signals (i.e., the output of the multiplexer 40) form the equalizing and vertical sync signal S11.

The even field horizontal sync signal S1 and the odd field horizontal sync signal S2, which are generated by the sync signal generator 20, are coupled to first and second inputs of a second multiplexer 120 of the horizontal sync signal generator 100, respectively. An even/odd field horizontal sync signal S12 is output by the second multiplexer 120 and supplied to the third multiplexer 50 and a counter 131 of an odd/even field detector 130.

Figure 3C:
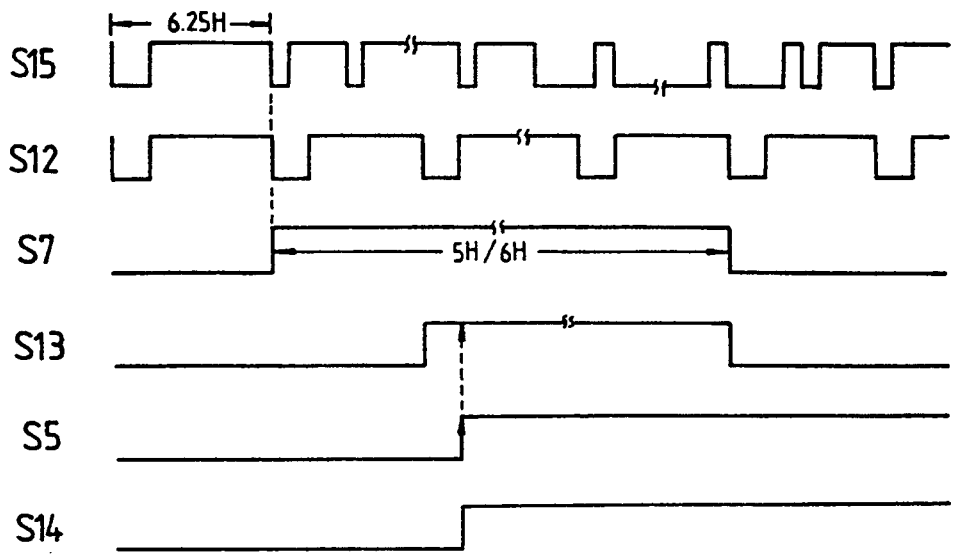
Figure 3D:
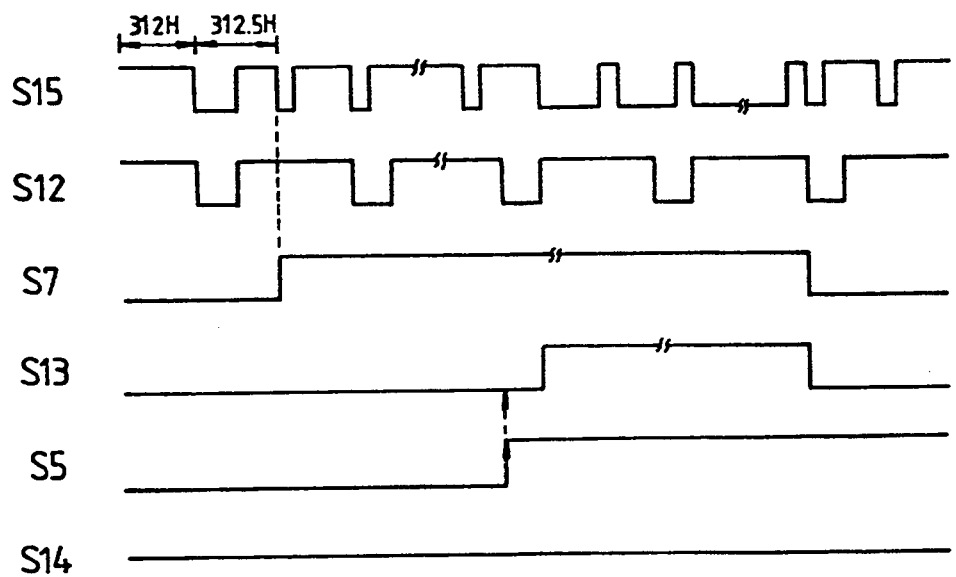

Referring to FIG. 3C, the 5 H/6 H window signal S7 output by the window signal generator 30 is supplied to a clear terminal CLR of the counter 131 so that the counter 131 operates during a high state of the window signal S7. Therefore, the counter 131 counts the number of clock signals S12 when the signal S7 is in a high state and the output signal S13 thereof is coupled to the D input of a D-type flip-flop 132. The even/odd field detection pulse S5, which is generated by the window signal generator 30, is supplied to the clock input of the D-type flip-flop 132. The D-type flip-flop 132 outputs a signal S14 when the clock signal S5 is asserted high. Thus, as shown in FIGS. 3C and 3D, if a value of the input signal S13 is in a high state when the clock signal S5 is varied from a low state to a high state, the output signal S14 is in a high state thereby forming an odd field horizontal sync signal. On the other hand, if input signal S13 of the D-type flip-flop 132 is in a low state when the clock signal S5 is varied, the output signal S14 is in a low state so as to form an even field horizontal sync signal.

The thus-detected even or odd field signal S14 is fedback to a comparator 110, which includes a NOR gate 111 and a J-K flip-flop 112. The comparator 110 compares an even/odd field signal $S_i$ of an externally supplied horizontal sync signal with the even/odd field signal S14 supplied from the even/odd field detector 130. The feedback and comparison procedure causes the sync signal of a field to match the even or odd field of the externally supplied horizontal sync signal. Specifically, the comparator 110 compares the fedback even/odd field signal S14 with the externally supplied even/odd field signal $S_i$ and supplies a selection signal S16 to the second multiplexer 120. The second multiplexer 120 then selectively outputs, according to the selection signal S16, either the even field horizontal sync signal S1 or the odd field horizontal sync signal S2. That is, when the two even/odd field signals input to the comparator 110 are identical, the second multiplexer 120 maintains the current output since the field of the currently output horizontal sync signal is the same as that of the externally supplied horizontal sync signal. However, when the two even/odd field signals input to the comparator 110 are different from each other (i.e., the field of the currently output horizontal sync signal is different from that of the externally supplied horizontal sync signal), the second multiplexer 120 varies the output signal.

The exclusive-OR gate 111 of the comparator 110 has first and second inputs coupled to the fedback even/odd field signal S14 and the externally supplied even/odd field signal $S_i$, respectively. The J-K flip-flop 112 includes J and K inputs which are both coupled to the output signal S17 of the exclusive-OR gate 111 and a clock input which is coupled to the vertical sync window signal S10. The exclusive-OR gate 111 outputs a low signal S17 when the two inputs are identical, otherwise it outputs a high signal S17. The output S16 of the J-K flip-flop is maintained if the J-K input signal S17 is in a low state, and toggles between high and low states in synchronism with the clock signal S10 when the J-K input is in a high state.

The even or odd field horizontal sync signal S12, which is output by the second multiplexer 120 and selected by the selection signal S16, is supplied to an input terminal IN1 of the third multiplexer 50. The equalizing and vertical sync signal S11, which is output from the first multiplexer 40, is supplied to the other input terminal IN2 of the third multiplexer 50. The 7.5 H/9 H window signal S8 output by the window signal generator 30 is supplied to a selection terminal SEL of the third multiplexer 50. The third multiplexer 50 outputs the equalizing and vertical sync signal S11 when the selection signal S8 is in a low state, and outputs the horizontal sync signal S12 when the selection signal S8 is in a high state, thereby generating a composite sync signal S15.

As described above, in a sync signal generating apparatus according to the present invention, mutual conversion of the sync signal is possible for all types of broadcast systems, and an odd field or an even field with respect to an externally supplied sync signal is identified to generate a horizontal sync signal which is consistent with the field of the externally supplied horizontal sync signal to thereby obtain a more accurate synchronization.

What is claimed is:

1. A sync signal generating apparatus for converting broadcast signals including sync signals that correspond to a first one of a plurality of broadcast systems to broadcast signals that correspond to a second selected one of the plurality of broadcast systems, said sync signal generating apparatus comprising:
    a broadcast system selection switch having a first set of inputs each being coupled to a signal having a subcarrier frequency corresponding to the plurality of broadcast systems, respectively, and an output for selectively outputting one of said signals;
    a sync signal generator, responsive to the output of said broadcast system selection switch, for generating even and odd horizontal sync signals, a vertical sync signal, and an equalizing signal which correspond to the respective broadcast systems;
    a window signal generator, responsive to said equalizing signal, for generating an even/odd field detection signal, a window signal, and a vertical sync window signal;
    a first multiplexer having first and second inputs coupled to said vertical sync signal and equalizing signal, respectively, and an output for selectively outputting in response to said vertical sync window signal one of said vertical sync signal and equalizing signal;
    a horizontal sync signal generator having inputs coupled to said even and odd field horizontal sync signal, even/odd field detection signal, window signal, and an external horizontal sync signal for generating a horizontal sync signal having one of an even and odd field in accordance with the field of said external horizontal sync signal; and
    a second multiplexer having first and second inputs coupled to an output of said first multiplexer and horizontal sync signal generator, respectively, and an output for selectively outputting in response to an output of said window signal generator a composite sync signal.

2. The sync signal generating apparatus according to claim 1, wherein said horizontal sync signal generator comprises a third multiplexer for selectively outputting one of said even and odd field horizontal sync signals generated by said sync signal generator, an even/odd field detector for detecting an even or an odd field of the horizontal sync signal output by said third multiplexer and for generating an even/odd field signal, and a comparator for comparing the even/odd field signal from said even/odd field detector with said external sync signal, and for supplying a selection signal to said third multiplexer so as to select a horizontal sync signal having a field identical to that of said external sync signal.

3. The sync signal generating apparatus according to claim 2, wherein said even/odd field detector comprises a counter, responsive to said horizontal sync signal output by said third multiplexer and said window signal, for counting in synchronism with said horizontal sync signal, and a flip-flop, responsive to an output of said counter and said even/odd field detection pulse, for generating said even/odd field signal.

4. The sync signal generating apparatus according to claim 2, wherein said comparator comprises an exclusive-OR gate having a first input coupled to said output signal from said even/odd field detector and a second input coupled to said external sync signal, and a flip-flop having inputs coupled to an output of said exclusive-OR gate and said vertical sync window signal, for generating and outputting a selection signal, said selection signal being coupled to said third multiplexer for selecting one of said even and odd horizontal sync signals.

5. A sync signal generating apparatus for converting broadcast signals including sync signals that correspond to a first one of a plurality of broadcast systems to broadcast signals that correspond to a second selected one of the plurality of broadcast systems, said sync signal generating apparatus comprising:
    a broadcast system selection switch having a first set of inputs each being coupled to a signal having a subcarrier frequency corresponding to the plurality of broadcast systems, respectively, and an output for selectively outputting one of said signals;
    a sync signal generator, responsive to the output of said broadcast system selection switch, for generating even and odd horizontal sync signals, a vertical sync signal, and an equalizing signal which correspond to the respective broadcast systems;
    means, coupled to said even and odd horizontal sync signals, for selectively generating a first signal corresponding to one of said even and odd horizontal sync signals;
    means, coupled to said vertical sync signal and equalizing signal, for selectively generating a second signal corresponding to one of said vertical sync signal and said equalizing signal; and
    means, coupled to said first and second signals, for selectively generating a composite sync signal corresponding to a combination of said first and second signals.

* * * * *